US012533782B2

(12) United States Patent
Chien

(10) Patent No.: US 12,533,782 B2
(45) Date of Patent: Jan. 27, 2026

(54) ELECTRIC NAIL GUN

(71) Applicant: BASSO INDUSTRY CORP., Taichung (TW)

(72) Inventor: Chia-Yu Chien, Taichung (TW)

(73) Assignee: BASSO INDUSTRY CORP., Taichung (TW)

(*) Notice: Subject to any disclaimer, the term of this patent is extended or adjusted under 35 U.S.C. 154(b) by 0 days.

(21) Appl. No.: 18/929,925

(22) Filed: Oct. 29, 2024

(65) Prior Publication Data

US 2025/0128391 A1 Apr. 24, 2025

(30) Foreign Application Priority Data

Nov. 2, 2023 (TW) ................................ 112142245

(51) Int. Cl.
*B25C 1/06* (2006.01)
*B25C 1/00* (2006.01)

(52) U.S. Cl.
CPC ................ *B25C 1/06* (2013.01); *B25C 1/008* (2013.01)

(58) Field of Classification Search
CPC .. B25C 1/06; B25C 1/008; B25C 1/00; B25C 1/08; B25C 5/15
See application file for complete search history.

(56) References Cited

U.S. PATENT DOCUMENTS

2022/0161405 A1* 5/2022 Chien ........................ B25C 1/06

FOREIGN PATENT DOCUMENTS

TW 200607617 A 3/2006

* cited by examiner

*Primary Examiner* — Veronica Martin
(74) *Attorney, Agent, or Firm* — Burris Law, PLLC

(57) ABSTRACT

An electric nail gun includes a frame unit, a flywheel that is rotatably connected to the frame unit, a swing arm unit, an impact member, a driving member that is swingably connected to the frame unit, and a strike prevention member that is swingably connected to the frame unit. The swing arm unit is operable to urge the impact member to be in contact with the flywheel. The impact member is urged by rotation of the flywheel to strike a nail. The driving member is operable to swing relative to the swing arm unit between an initial position and a trigger position, and drives the swing arm unit to move toward the flywheel when the driving member swings from the initial position to the trigger position. The strike prevention member is driven by the driving member to swing relative to the impact member and the driving member.

11 Claims, 9 Drawing Sheets

ELECTRIC NAIL GUN

CROSS-REFERENCE TO RELATED APPLICATION

This application claims priority to Taiwanese Invention Patent Application No. 112142245, filed on Nov. 2, 2023, the entire disclosure of which is incorporated by reference herein.

FIELD

The present disclosure relates to an electric nail gun, and more particularly to an electric nail gun that prevents accidental discharges.

BACKGROUND

A known power tool disclosed in Taiwanese Patent Publication No. 200607617A includes a flywheel that is for transmitting kinetic energy, a driver that is for striking a nail, and a blocking member that is for locking the driver after the driver returns to its initial position.

During a nail-striking operation, the blocking member is disengaged from the driver so that the driver may be pushed forwardly by a pushing member for a short distance and then be in contact with a pressing roller. The driver is pushed by the pressing roller to come into contact with the flywheel, and receives the kinetic energy to strike the nail. When the nail has been struck and when the driver has returned to its initial position, the blocking member limits movement of the driver to prevent the driver from accidentally striking another nail.

However, when striking the nail, the driver comes into contact with the flywheel and the pressing roller simultaneously, thereby resulting in excessive loss of the kinetic energy and unsmooth movement of the driver.

SUMMARY

Therefore, an object of the disclosure is to provide an electric nail gun that can alleviate at least one of the drawbacks of the prior art.

According to the disclosure, the electric nail gun includes a frame unit, a power unit, a swing arm unit, an impact unit, a driving unit, and an accidental discharge prevention unit. The power unit is mounted to the frame unit, and includes a flywheel that is rotatably connected to the frame unit and that is driven by electric power. The swing arm unit is swingably connected to the frame unit, and is swingable relative to the flywheel. The impact unit is movably disposed on the swing arm unit, is movable in any one of a nail-striking direction and a returning direction that is opposite to the nail-striking direction, and includes an impact member. The swing arm unit is operable to urge the impact member to be in contact with the flywheel. The impact member is urged by rotation of the flywheel to strike a nail when the impact member is brought into contact with the flywheel, and has a stop surface. The driving unit includes a driving member that is swingably connected to the frame unit. The driving member is operable to swing relative to the swing arm unit between an initial position and a trigger position. The driving member releases the swing arm unit when the driving member is in the initial position so that the swing arm unit is distal from the flywheel. The driving member drives the swing arm unit to move toward the flywheel when the driving member swings from the initial position to the trigger position. The accidental discharge prevention unit includes a strike prevention member that is swingably connected to the frame unit. The strike prevention member is driven by the driving member to swing relative to the impact member and the driving member between a locked position and a releasing position. The strike prevention member is limited between the stop surface of the impact member and the driving member that is in the initial position when the strike prevention member is in the locked position to prevent the impact member from moving. The strike prevention member is separated from the impact member when the strike prevention member is in the releasing position.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
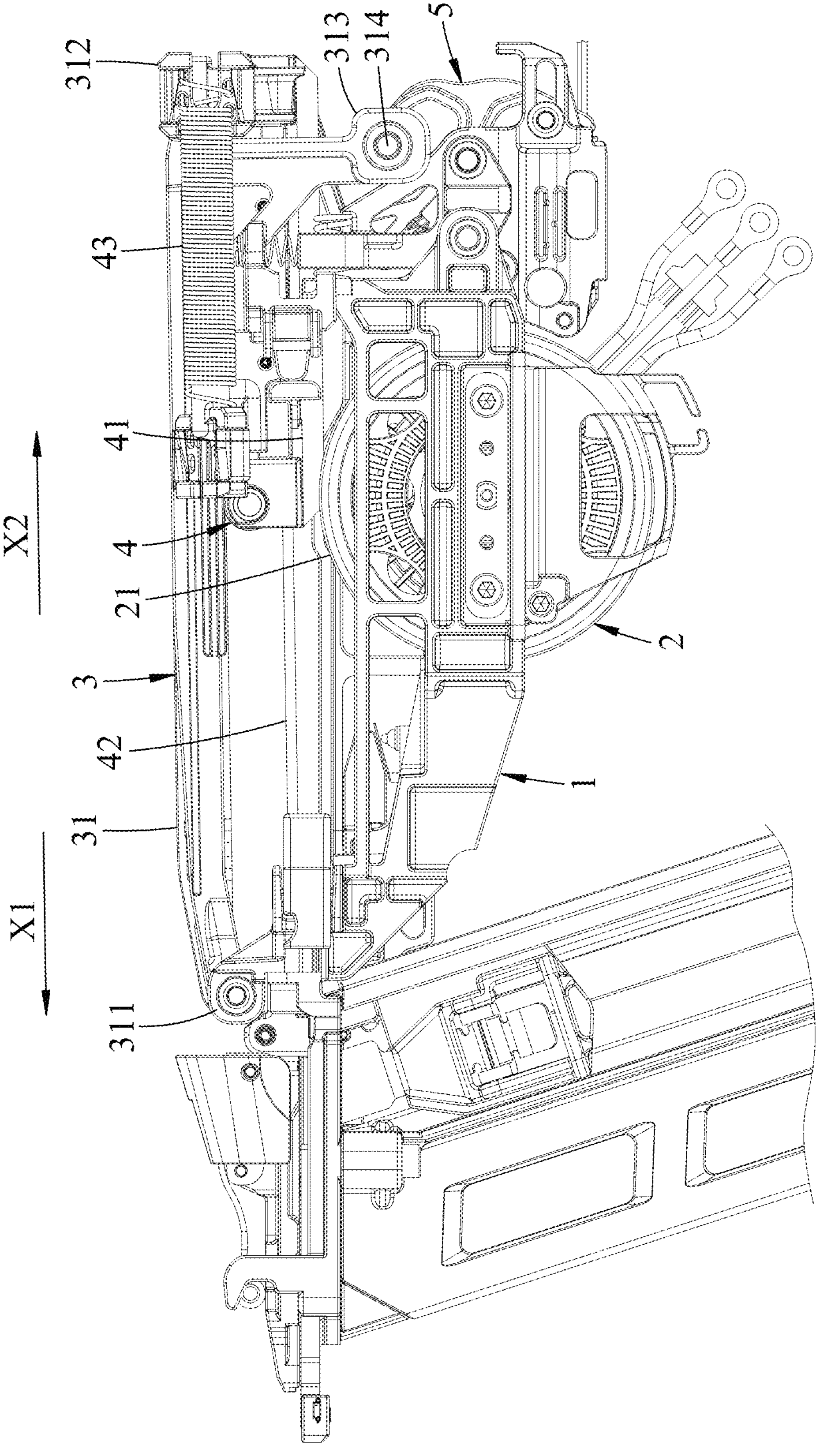
FIG. 1 is a fragmentary front view of an embodiment of an electric nail gun according to the present disclosure.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
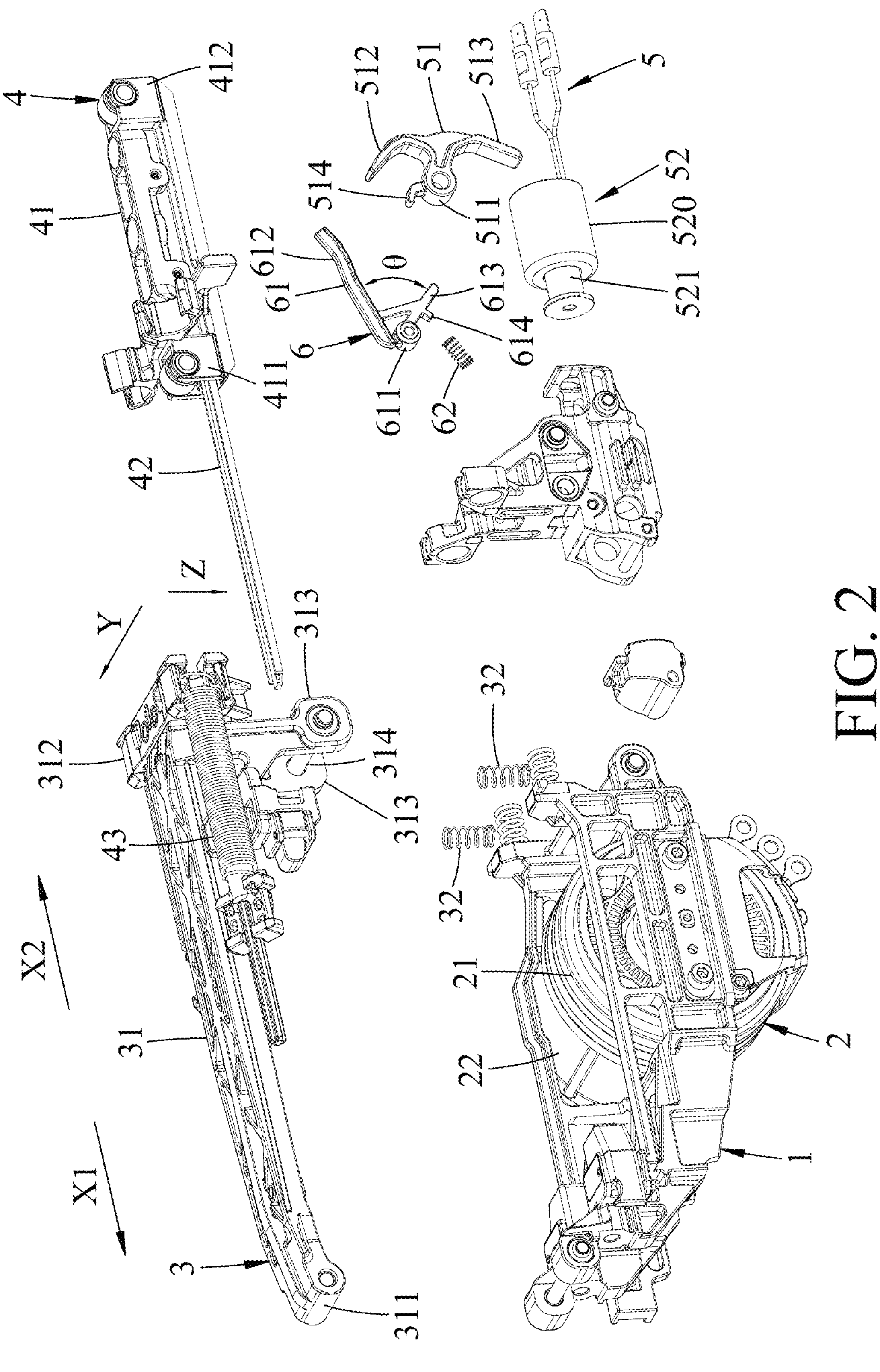
FIG. 2 is a partly exploded perspective view of part of the embodiment.
Figure 3:
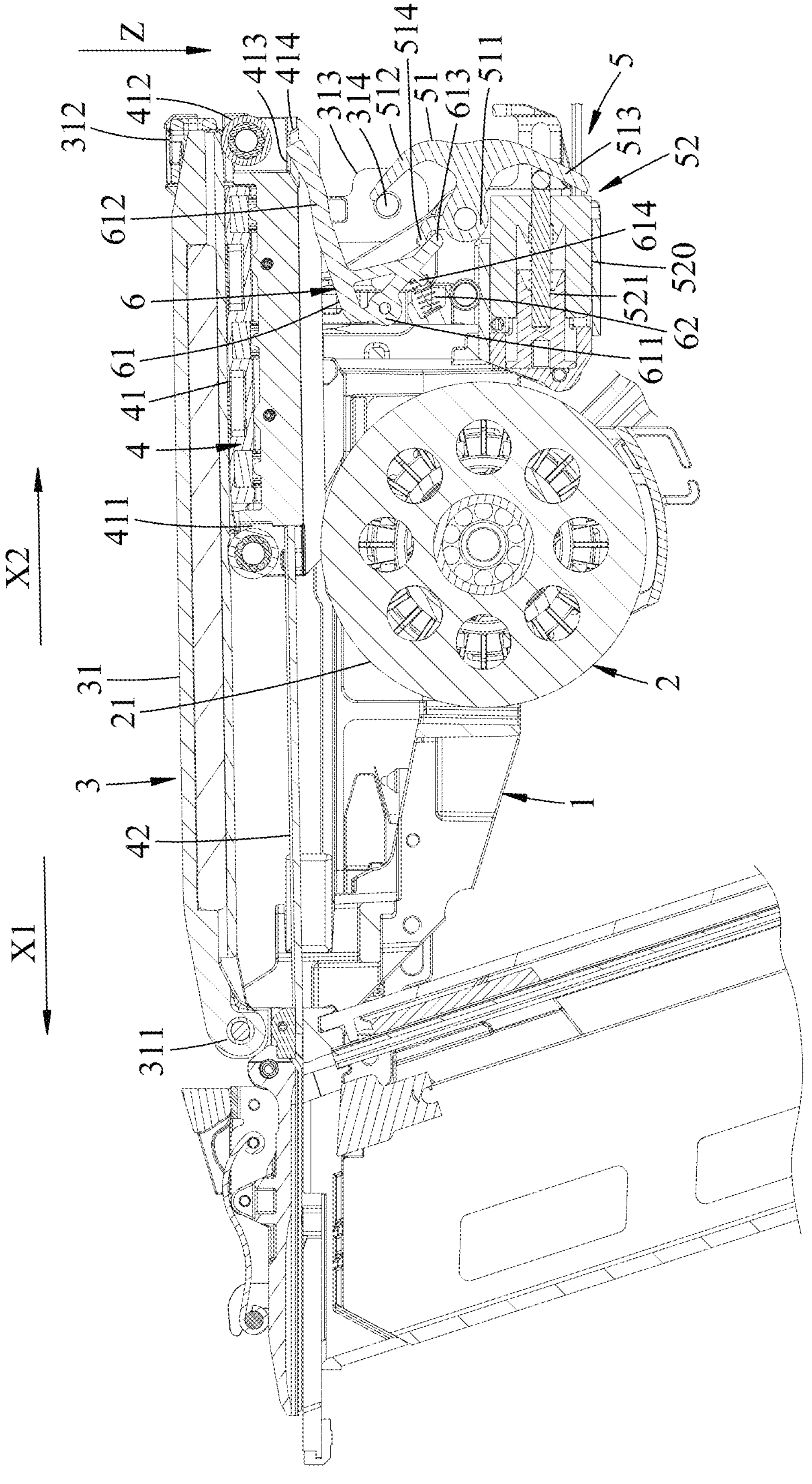
FIG. 3 is a fragmentary sectional view, illustrating a strike prevention member of the embodiment in a locked position, a driving member of the embodiment in an initial position, and an impact member of the embodiment in a ready position and being blocked by the strike prevention member.

Referring to FIGS. 1, 2, and 3, an embodiment of an electric nail gun according to the present disclosure includes a frame unit 1, a power unit 2, a swing arm unit 3, an impact unit 4, a driving unit 5, and an accidental discharge prevention unit 6.

The power unit 2 is mounted to the frame unit 1, and includes a flywheel 21 that is rotatably connected to the frame unit 1, and a motor subunit 22 that is operable to drive rotation of the flywheel 21. Thus, the flywheel 21 is driven by electric power.

The swing arm unit 3 extends in a nail-striking direction (X1), is swingably connected to the frame unit 1, and is swingable relative to the flywheel 21 in a swing direction (Z) that is substantially perpendicular to the nail-striking direction (X1). The swing arm unit 3 includes a swing subunit 31, and two swing arm resilient members 32.

The swing subunit 31 has a first end portion 311 that is rotatably connected to the frame unit 1, a second end portion 312 that is opposite to the first end portion 311 and that is spaced apart from the flywheel 21, two support frames 313 that are connected to the second end portion 312 and that are spaced apart from each other along a width direction (Y), and an interconnecting member 314 that extends along the width direction (Y), that interconnects the support frames 313, and that is spaced apart from the second end portion 312 along the swing direction (Z). A distance between the second end portion 312 and the flywheel 21 in the swing direction (Z) increases or decreases when the swing arm unit 3 swings relative to the flywheel 21 in the swing direction (Z). In this embodiment, each of the support frames 313 extends in the swing direction (Z), the interconnecting member 314 is a round rod, and the width direction (Y) is substantially perpendicular to the nail-striking direction (X1) and the swing direction (Z).

The swing arm resilient members 32 are disposed between the frame unit 1 and the second end portion 312 of the swing subunit 31, and resiliently bias the second end portion 312 away from the flywheel 21.

The impact unit 4 is movably disposed on the swing arm unit 3, and includes an impact member 41 that is connected to the swing arm unit 3, a nail-striking member 42 that is connected to the impact member 41 and that is for striking a nail, and a returning subunit 43.

The impact member 41 has a front driving portion 411, a rear driving portion 412 that is opposite to the front driving portion 411 and that is farther from the first end portion 311 of the swing subunit 31 than the front driving portion 411, and a recess 413 that is formed in the rear driving portion 412 and that opens downwardly. The recess 413 has a stop surface 414 that is formed on one end thereof which is distal from the front driving portion 411. The swing arm unit 3 is operable to urge the impact member 41 to be in contact with the flywheel 21. The impact member 41 is movable in any one of the nail-striking direction (X1) and a returning direction (X2) that is opposite to the nail-striking direction (X1), and is urged by the rotation of the flywheel 21 to move in the nail-striking direction (X1) when the impact member 41 is brought into contact with the flywheel 21 such that the nail-striking member 42 connected to the impact member 41 strikes the nail. The impact member 41 is movable between a ready position (see FIGS. 1 and 5) and a nail-striking position (see FIG. 7). When the impact member 41 is in the ready position, the impact member 41 is distal from the first end portion 311 of the swing arm unit 3, and is proximate to the second end portion 312 of the swing arm unit 3. When the impact member 41 is in the nail-striking position, the impact member 41 is distal from the second end portion 312, and is proximate to the first end portion 311.

In this embodiment, the returning subunit 43 is an assembly of resilient components, interconnects the impact member 41 and the second end portion 312 of the swing subunit 31, and resiliently biases the impact member 41 toward the ready position. Specifically, the returning subunit 43 is a spring.

The driving unit 5 includes a driving member 51 that is swingably connected to the frame unit 1, and an electromagnetic valve 52 that is mounted to the frame unit 1.

The driving member 51 is located at one side of the swing arm unit 3 in the swing direction (Z). The driving member 51 has a rotation portion 511 that is rotatably mounted to the frame unit 1, a pressing portion 512 that extends toward the swing arm unit 3 in the swing direction (Z), that abuts against the interconnecting member 314, and that is operable for urging the swing arm unit 3 to move, a driven portion 513 that is opposite to the pressing portion 512 and that is operable, and a limiting portion 514 that is connected to the rotation portion 511.

Figure 4:
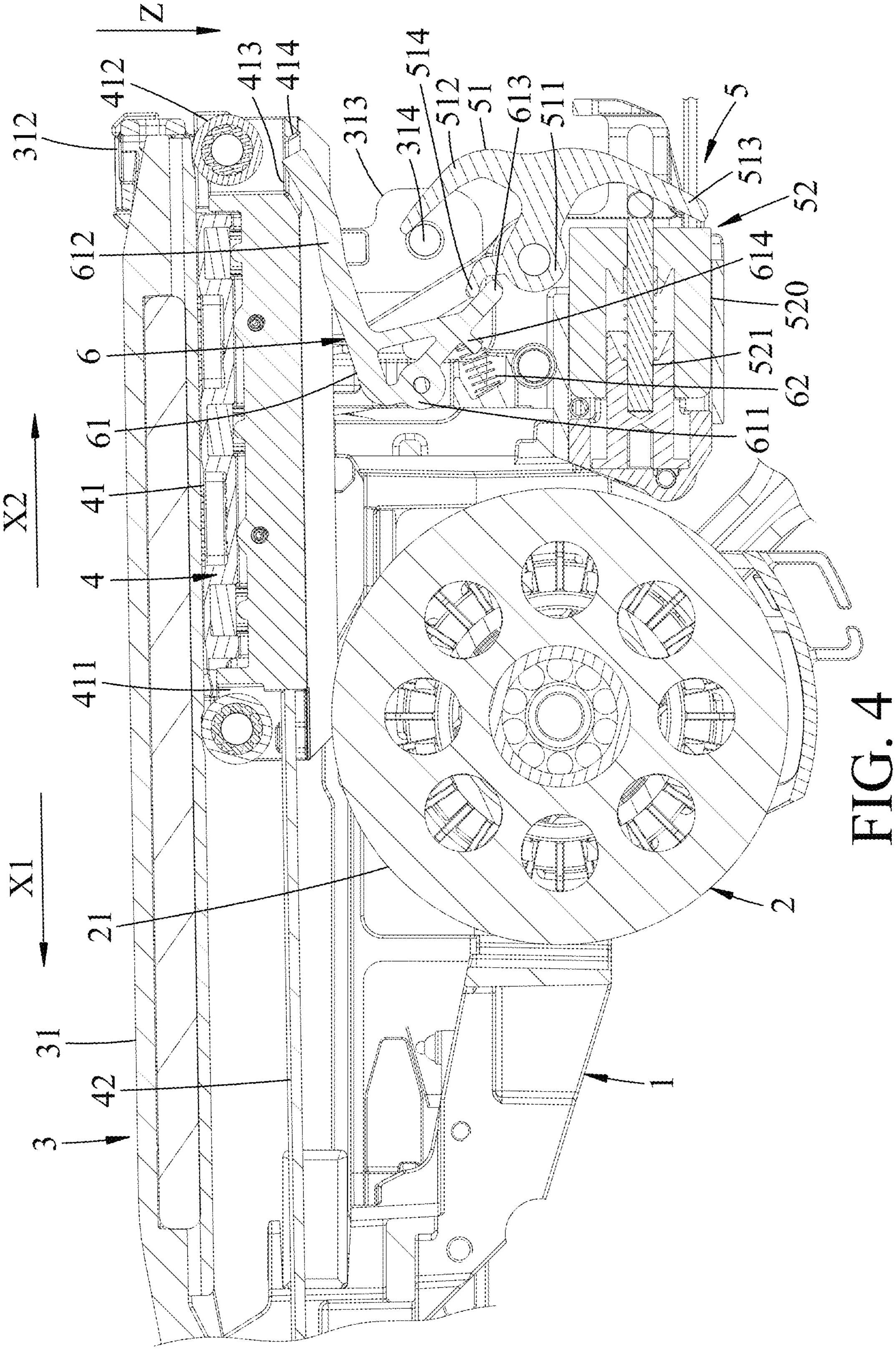
FIG. 4 is an enlarged view of a portion of FIG. 3.
Figure 5:
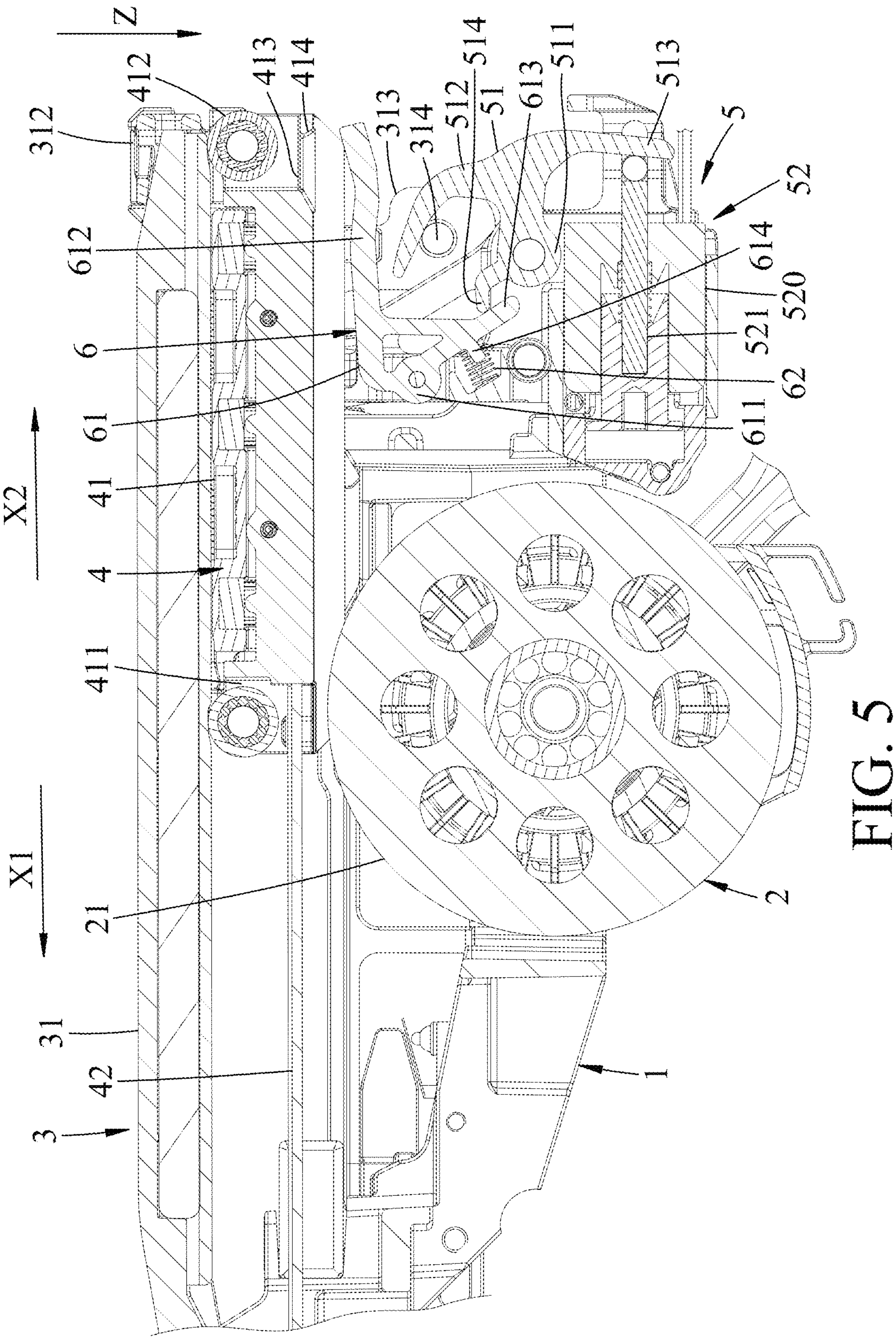
FIG. 5 is a fragmentary sectional view, illustrating the strike prevention member in a releasing position and the driving member in a trigger position.
Figure 6:
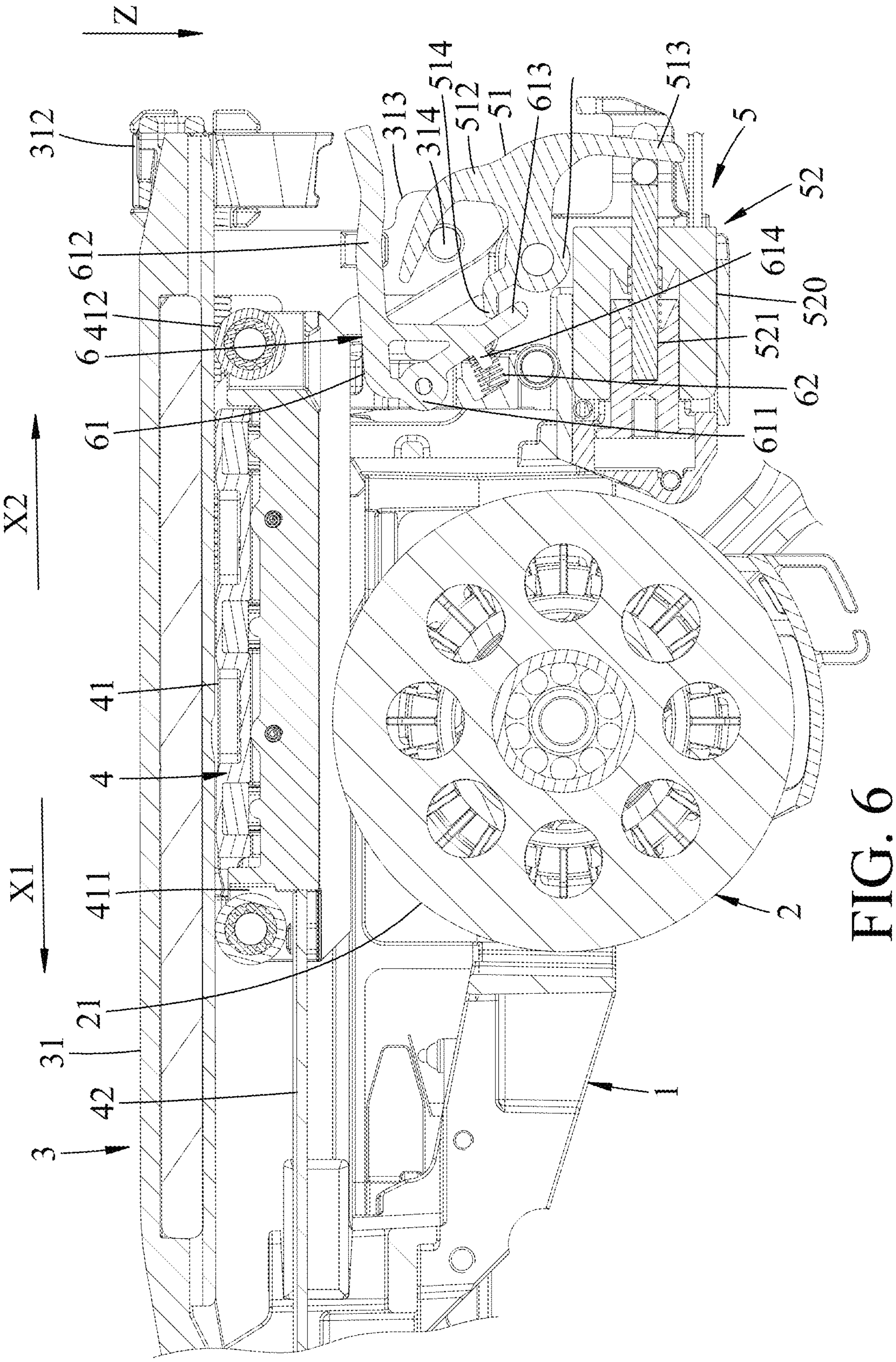
FIG. 6 is a view similar to FIG. 5, but illustrating that the impact member is moved away from the ready position in a nail-striking direction.

The driving member 51 is operable to swing relative to the interconnecting member 314 of the swing subunit 31 between an initial position (as shown in FIGS. 3 and 4) and a trigger position (as shown in FIGS. 5 and 6). When the driving member 51 is in the initial position, the pressing portion 512 of the driving member 51 releases the interconnecting member 314 of the swing subunit 31 so that the second end portion 312 of the swing subunit 31 is distal from the flywheel 21. When the driving member 51 swings from the initial position to the trigger position, the pressing portion 512 of the driving member 51 drives the interconnecting member 314 of the swing subunit 31 to move such that the second end portion 312 of the swing subunit 31 is urged to move toward the flywheel 21. When the driving member 51 is in the trigger position, the pressing portion 512 of the driving member 51 presses against the interconnecting member 314 of the swing subunit 31 such that the second end portion 312 of the swing subunit 31 is proximate to the flywheel 21.

The electromagnetic valve 52 includes a valve main body 520, and a valve rod 521 that abuts against the driven portion 513 of the driving member 51 and that is movable in any one of the nail-striking direction (X1) and the returning direction (X2). When the electromagnetic valve 52 is energized, the valve rod 521 is driven by a magnetic force to extend from the valve main body 520 in the returning direction (X2), and urges the driving member 51 to swing to the trigger position. When the electromagnetic valve 52 is de-energized, the valve rod 521 is retracted into the valve main body 520 in the nail-striking direction (X1).

The accidental discharge prevention unit 6 includes a strike prevention member 61 that is swingably connected to the frame unit 1, and a resilient member 62. The recess 413 of the impact member 41 opens toward the strike prevention member 61.

The strike prevention member 61 is disposed between the flywheel 21 and the driving member 51 along the nail-striking direction (X1), and is disposed between the impact member 41 and the driving member 51 in the swing direction (Z). The strike prevention member 61 has a connecting portion 611 that is rotatably connected to the frame unit 1, a strike prevention portion 612 that extends from the connecting portion 611 substantially in the returning direction (X2) and that is located between the impact member 41 and the driving member 51, and an abutting portion 613 that is connected to the connecting portion 611, that abuts against the limiting portion 514 of the driving member 51, and that cooperates with the strike prevention portion 612 to define an included angle (θ) therebetween. The included angle (θ) is smaller than 90 degrees. The abutting portion 613 has a protrusion 614. The connecting portion 611 is rotatable relative to the frame unit 1 about a rotation axis. A distance between a distal end of the strike prevention portion 612 and the rotation axis is greater than a distance between a distal end of the abutting portion 613 and the rotation axis. When the strike prevention member 61 swings, an arc length of swing movement of the strike prevention portion 612 is greater than an arc length of swing movement of the abutting portion 613. Thus, even if a swing angle is small when the strike prevention member 61 swings, a distance traveled by the strike prevention portion 612 relative to the impact member 41 is still amplified.

Figure 7:
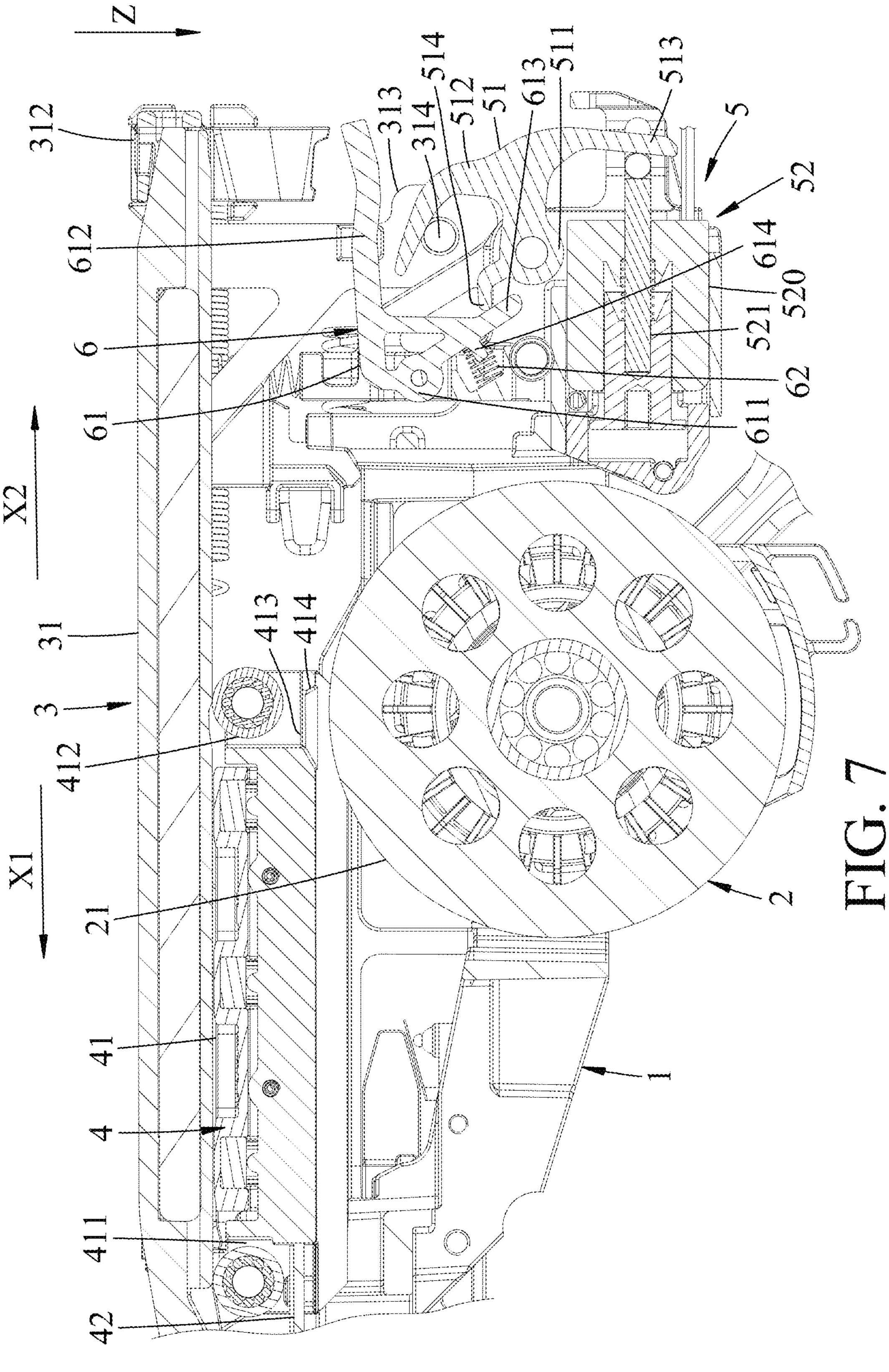
FIG. 7 is a view similar to FIG. 6, but illustrating the impact member in a nail-striking position.

The strike prevention member 61 is driven by the driving member 51 to swing relative to the impact member 41 and the driving member 51 between a locked position (see FIGS. 3 and 4) and a releasing position (see FIGS. 5, 6, and 7). When the strike prevention member 61 is in the locked position, the strike prevention portion 612 extends into the recess 413 of the impact member 41, and is adjacent to and faces the stop surface 414, the abutting portion 613 is blocked by the limiting portion 514 of the driving member 51 that is in the initial position, and the strike prevention member 61 is limited between the stop surface 414 of the impact member 41 and the driving member 51 that is in the initial position to prevent the impact member 41 from moving. When the strike prevention member 61 is in the releasing position, the strike prevention member 61 is separated from the impact member 41.

The resilient member 62 is mounted between the frame unit 1 and the protrusion 614 of the abutting portion 613 of the strike prevention member 61, and resiliently biases the strike prevention member 61 toward the locked position.

It is noted that, when the driving member 51 swings from the initial position to the trigger position, the abutting portion 613 of the strike prevention member 61 is pushed by the limiting portion 514 of the driving member 51 such that the abutting portion 613 swings in a direction opposite to a direction in which the driving member 51 swings and compresses the resilient member 62, and that the strike prevention portion 612 swings away from the impact member 41.

Referring to FIGS. 3 and 4, when the electromagnetic valve 52 is de-energized, the valve rod 521 is retracted into the valve main body 520 in the nail-striking direction (X1), and the resilient member 62 resiliently biases the abutting portion 613 of the strike prevention member 61 such that the strike prevention member 61 swings counterclockwise (viewing from FIGS. 3 and 4) toward the locked position, and that the driving member 51 is urged by the abutting portion 613 to swing clockwise (viewing from FIGS. 3 and 4) toward the initial position until the driven portion 513 of the driving member 51 is blocked by the electromagnetic valve 52 (i.e., until the driving member 51 is in the initial position). At this time, the limiting portion 514 of the driving member 51 blocks the strike prevention member 61 to cease swing movement of the strike prevention member 61 so that the strike prevention member 61 is kept in the locked position. Meanwhile, the swing subunit 31 is biased by the swing arm resilient member 32 to move away from the flywheel 21 until the interconnecting member 314 is blocked by the pressing portion 512 of the driving member 51, and the impact member 41 is biased by the returning subunit 43 to move in the returning direction (X2) to the ready position. In this embodiment, the driving member 51 is urged to swing clockwise toward the initial position until the driven portion 513 of the driving member 51 is blocked by the electromagnetic valve 52, but in one embodiment, the driving member 51 may be urged to swing clockwise toward the initial position until the driven portion 513 of the driving member 51 is blocked by the frame unit 1.

Therefore, the strike prevention member 61 is limited between the driving member 51 and the impact member 41 such that the strike prevention member 61 is not swingable. Furthermore, because the distance between the second end portion 312 of the swing subunit 31 and the flywheel 21 in the swing direction (Z) is increased when the swing subunit 31 is moved away from the flywheel 21, when the impact member 41 is in the ready position, the impact member 41 is adjacent to the flywheel 21 but is still spaced apart from the flywheel 21 (i.e., not in contact with the flywheel 21). Under this circumstances, the strike prevention member 61 is not swingable, and the stop surface 414 of the impact member 41 is blocked by the strike prevention portion 612 of the strike prevention member 61. Hence, even if a user accidentally places the electric nail gun such that it abuts against an object (not shown) while the flywheel 21 is still rotating, as long as the electromagnetic valve 52 is not energized by the user's operation, the impact member 41 is limited in the ready position and is prevented from moving away from the ready position, thereby preventing accidental discharges of nails.

Referring to FIGS. 5, 6, and 7, when the flywheel 21 rotates counterclockwise at a predetermined rotational speed and has a predetermined rotational kinetic energy, and when the electromagnetic valve 52 is energized, the valve rod 521 is driven by the magnetic force to move in the returning direction (X2) to push the driving member 51 to swing counterclockwise such that the driven portion 513 moves away from the valve main body 520. During counterclockwise swing movement of the driving member 51, the pressing portion 512 of the driving member 51 presses the interconnecting member 314 and the limiting portion 514 of the driving member 51 presses the abutting portion 613 of the strike prevention member 61.

Consequently, the strike prevention member 61 is driven by the driving member 51 to overcome a restoring force provided by the resilient member 62, and to swing clockwise from the locked position toward the releasing position. Simultaneously, the swing arm unit 3 is driven by the driving member 51 to overcome a restoring force provided by the swing arm resilient member 32, and to swing in the swing direction (Z), thereby reducing the distance between the second end portion 312 of the swing subunit 31 and the flywheel 21 in the swing direction (Z), and urging the impact member 41 that is in the ready position to move toward the flywheel 21. When the driving member 51 swings to the trigger position and when the strike prevention member 61 swings to the releasing position, the impact member 41 comes into contact with the flywheel 21, is not blocked by the strike prevention member 61, is urged by the rotation of the flywheel 21 to move from the ready position toward the first end portion 311 of the swing arm unit 3 in the nail-striking direction (X1), strikes the nail via the nail-striking member 42 that is connected thereto, and arrives at the nail-striking position, as shown in FIG. 7.

Figure 8:
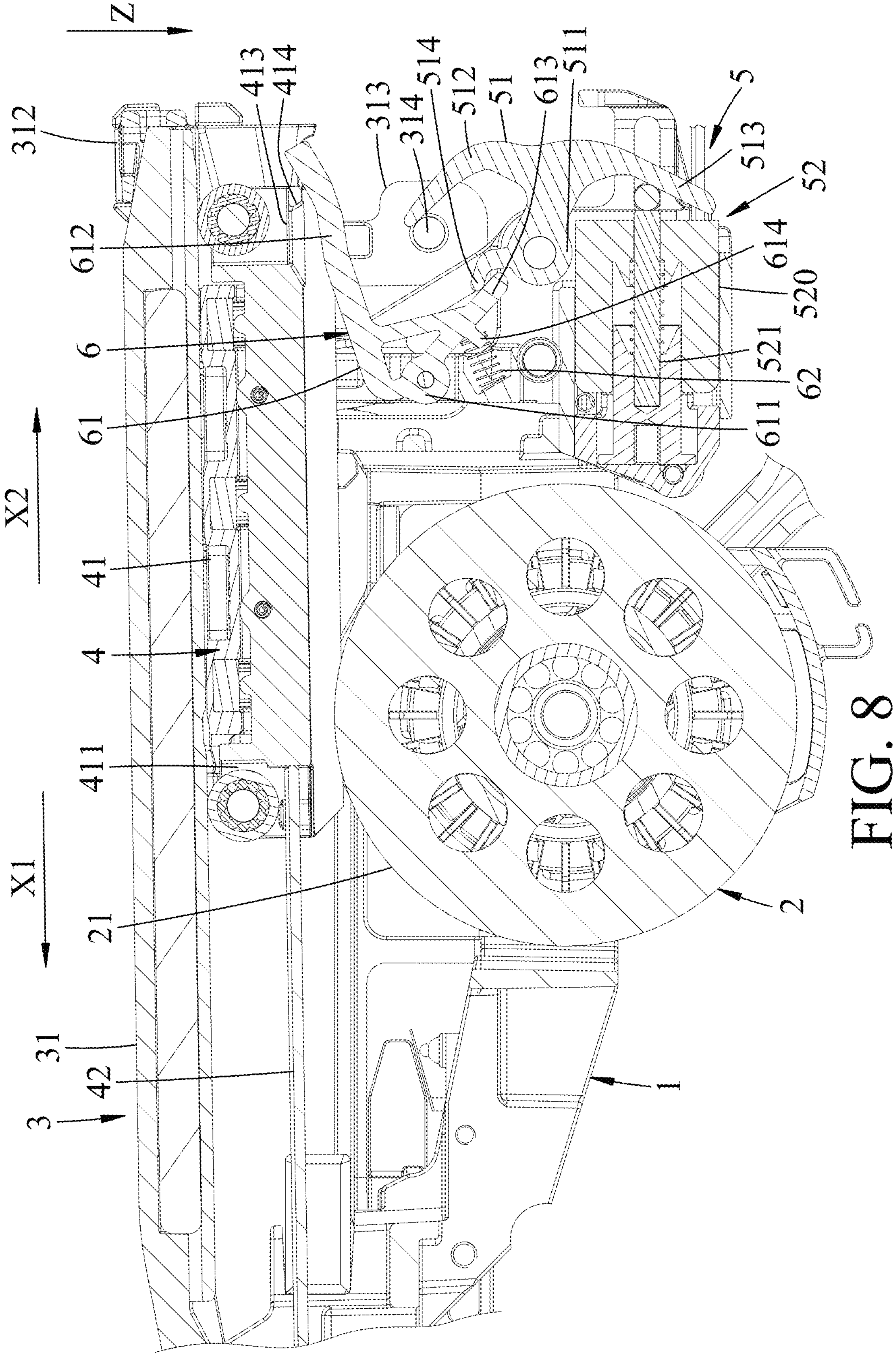
FIG. 8 is a fragmentary sectional view, illustrating that the impact member is moved in a returning direction from the nail-striking position to the ready position.
Figure 9:
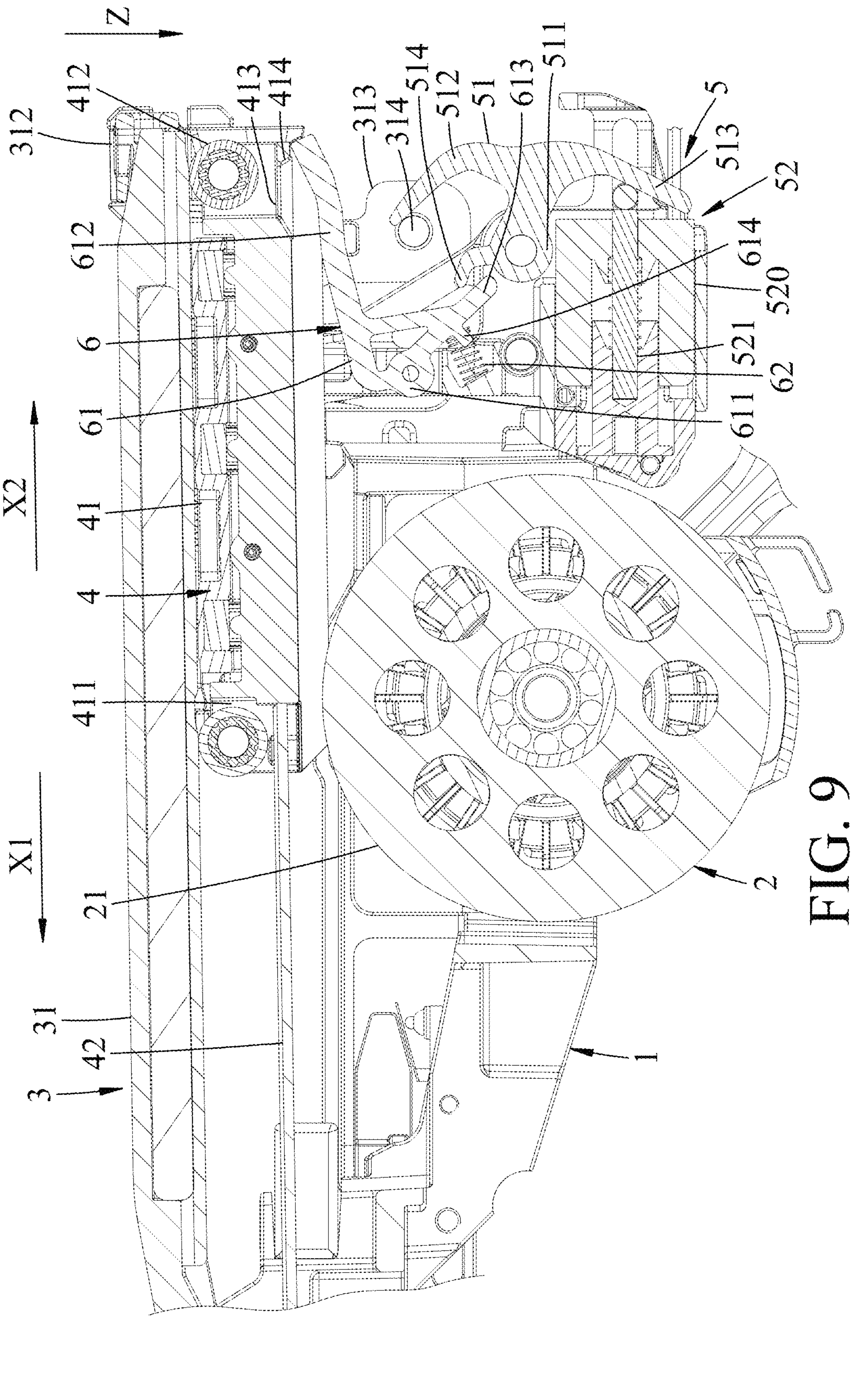
FIG. 9 is a view similar to FIG. 8, but illustrating that the strike prevention member is pushed by the impact member such that the strike prevention member swings away from the locked position.

Referring to FIGS. 8, 9, and 3, after the nail-striking member 42 strikes the nail, the electromagnetic valve 52 is de-energized again. The resilient member 62 resiliently biases the abutting portion 613 of the strike prevention member 61 such that the strike prevention member 61 swings counterclockwise to the locked position again, thereby urging the driving member 51 to swing clockwise to the initial position. Meanwhile, the driving member 51 releases the swing subunit 31 when in the initial position such that the swing subunit 31 is biased by the swing arm resilient member 32 to move away from the flywheel 21 again until the interconnecting member 314 is blocked by the pressing portion 512 of the driving member 51.

When the distance between the second end portion 312 of the swing subunit 31 and the flywheel 21 in the swing direction (Z) is increased, the impact member 41 is separated from the flywheel 21, and is biased by the returning subunit 43 to move from the nail-striking position toward the second end portion 312 of the swing subunit 31 in the returning direction (X2). When the impact member 41 is moved in the returning direction (X2) and is approaching the ready position, the rear driving portion 412 pushes the strike prevention portion 612 of the strike prevention member 61 such that the strike prevention member 61 swings clockwise and continues to be in contact with the impact member 41 without blocking the impact member 41. When the impact member 41 is in the ready position, the strike prevention portion 612 of the strike prevention member 61 extends into the recess 413 of the impact member 41 such that the strike prevention member 61 is limited between the driving member 51 and the impact member 41 and is not swingable again.

Through the above description, the advantages of the electric nail gun are summarized as follows. By virtue of the strike prevention member 61 being swingable relative to the impact member 41 between the locked position and the releasing position, when the strike prevention member 61 is in the locked position, the strike prevention member 61 may block movement of the impact member 41 under unexpected circumstances, thereby preventing the accidental discharges of the nails. In addition, during a nail-striking operation, the strike prevention member 61 is separated from the impact member 41, thereby allowing the impact member 41 and the nail-striking member 42 to striking the nail. In this manner, safety of the electric nail gun is improved, and the impact member 41 is not blocked during the nail-striking operation, thereby facilitating smoothness of the nail-striking operation.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. An electric nail gun comprising:

a frame unit;

a power unit mounted to the frame unit, and including a flywheel that is rotatably connected to the frame unit and that is driven by electric power;

a swing arm unit swingably connected to the frame unit and swingable relative to the flywheel;

an impact unit movably disposed on the swing arm unit, movable in any one of a nail-striking direction and a returning direction that is opposite to the nail-striking direction, and including an impact member, the swing arm unit being operable to urge the impact member to be in contact with the flywheel, the impact member being urged by rotation of the flywheel to strike a nail when the impact member is brought into contact with the flywheel, and having a stop surface;

a driving unit including a driving member that is swingably connected to the frame unit, the driving member being operable to swing relative to the swing arm unit between an initial position and a trigger position, the driving member releasing the swing arm unit when the driving member is in the initial position so that the swing arm unit is distal from the flywheel, the driving member driving the swing arm unit to move toward the flywheel when the driving member swings from the initial position to the trigger position; and an accidental discharge prevention unit including a strike prevention member that is swingably connected to the frame unit, the strike prevention member being driven by the driving member to swing relative to the impact member and the driving member between a locked position and a releasing position, the strike prevention member being limited between the stop surface of the impact member and the driving member that is in the initial position when the strike prevention member is in the locked position to prevent the impact member from moving, the strike prevention member being separated from the impact member when the strike prevention member is in the releasing position.

2. The electric nail gun as claimed in claim 1, wherein the strike prevention member has a connecting portion that is rotatably connected to the frame unit, and a strike prevention portion that extends from the connecting portion substantially in the returning direction and that is located between the impact member and the driving member, the strike prevention portion being adjacent to the stop surface when the strike prevention member is in the locked position.

3. The electric nail gun as claimed in claim 2, wherein the strike prevention member further has an abutting portion that is connected to the connecting portion and that cooperates with the strike prevention portion to define an included angle therebetween, the connecting portion being rotatable relative to the frame unit about a rotation axis, a distance between a distal end of the strike prevention portion and the rotation axis being greater than a distance between a distal end of the abutting portion and the rotation axis.

4. The electric nail gun as claimed in claim 3, wherein the included angle is smaller than 90 degrees, the abutting portion being blocked by the driving member that is in the initial position when the strike prevention member is in the locked position, the abutting portion of the strike prevention member being pushed by the driving member when the driving member swings from the initial position to the trigger position such that the abutting portion swings in a direction opposite to a direction in which the driving member swings and that the strike prevention portion swings away from the impact member.

5. The electric nail gun as claimed in claim 3, wherein the impact member has a recess that opens toward the strike prevention member, the recess having the stop surface, the strike prevention portion extending into the recess and facing the stop surface when the strike prevention member is in the locked position.

6. The electric nail gun as claimed in claim 3, wherein the accidental discharge prevention unit further includes a resilient member that is mounted between the frame unit and the abutting portion of the strike prevention member, and that resiliently biases the strike prevention member toward the locked position.

7. The electric nail gun as claimed in claim 6, wherein the driving member has a rotation portion that is rotatably mounted to the frame unit, a pressing portion that extends toward the swing arm unit and that is operable for urging the swing arm unit to move, a driven portion that is opposite to the pressing portion and that is operable, and a limiting portion that is connected to the rotation portion, the limiting portion abutting against the abutting portion of the strike prevention member, the driven portion being blocked when the driving member is in the initial position.

8. The electric nail gun as claimed in claim 7, wherein the driving unit further includes an electromagnetic valve that is mounted to the frame unit, the electromagnetic valve including a valve rod that abuts against the driven portion of the driving member and that is movable in any one of the nail-striking direction and the returning direction, the valve rod being operable to urge the driving member to swing to the trigger position, the resilient member resiliently biasing the strike prevention member toward the locked position such that the driving member is urged to swing toward the initial position until the driven portion of the driving member is blocked by the electromagnetic valve.

9. The electric nail gun as claimed in claim 7, wherein the swing arm unit is swingable relative to the flywheel in a swing direction that is substantially perpendicular to the nail-striking direction, and has a first end portion that is rotatably connected to the frame unit, a second end portion that is opposite to the first end portion, two support frames that are connected to the second end portion and that extend in the swing direction, and an interconnecting member that interconnects the support frames and that abuts against the pressing portion of the driving member.

10. The electric nail gun as claimed in claim 9, wherein the strike prevention member is located between the flywheel and the driving member along the nail-striking direction.

11. The electric nail gun as claimed in claim 9, wherein the driving member is located at one side of the swing arm unit in the swing direction, and the strike prevention member is disposed between the impact member and the driving member in the swing direction.

* * * * *